Dec. 11, 1934.  H. P. DONLE  1,984,336
TELEVISION METHOD AND APPARATUS
Filed June 16, 1931  2 Sheets—Sheet 1
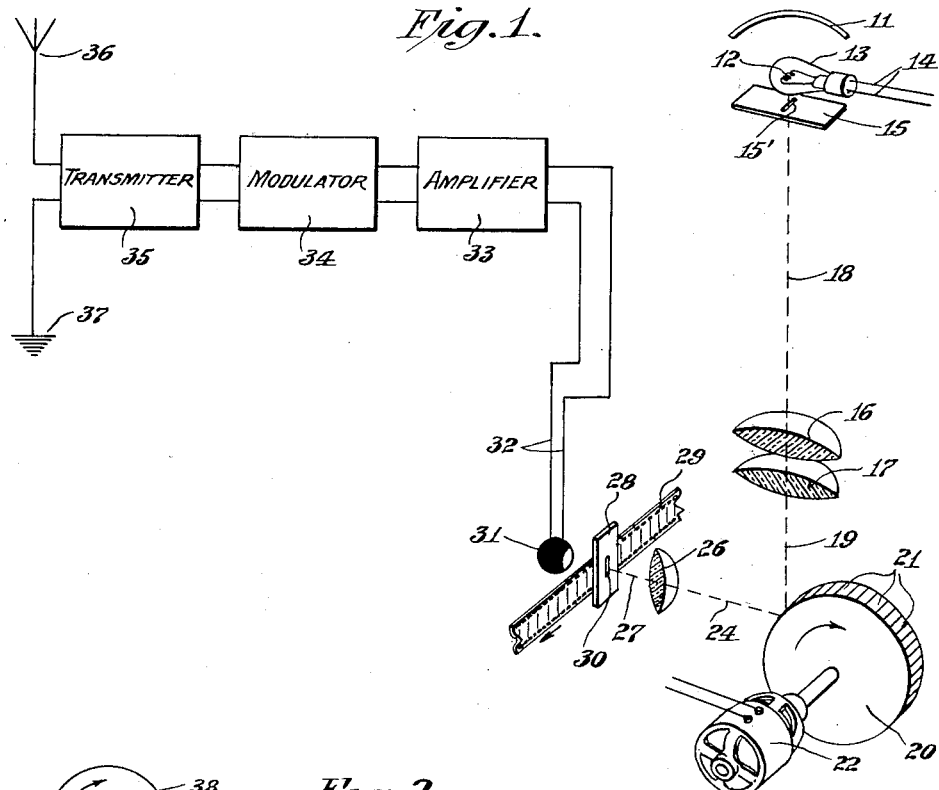
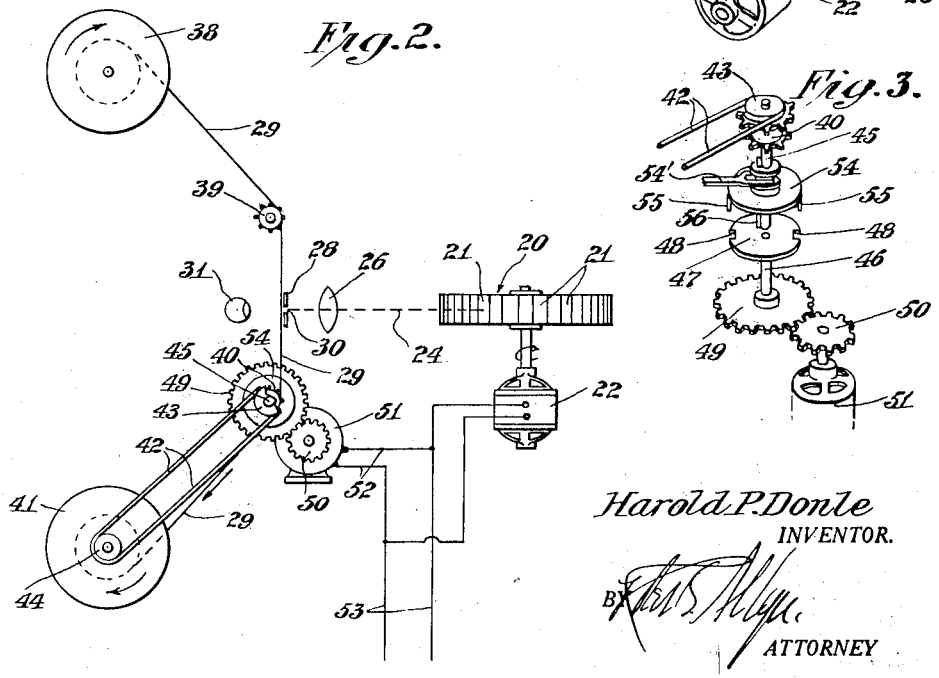
Harold P. Donle
INVENTOR.
BY
ATTORNEY Dec. 11, 1934.    H. P. DONLE    1,984,336
TELEVISION METHOD AND APPARATUS
Filed June 16, 1931    2 Sheets-Sheet 2

Harold P. Donle
INVENTOR.

BY
ATTORNEY

Patented Dec. 11, 1934

1,984,336

UNITED STATES PATENT OFFICE 1,984,336

TELEVISION METHOD AND APPARATUS

Harold P. Donle, Meriden, Conn., assignor to Radio Inventions, Inc., a corporation of New York Application June 16, 1931, Serial No. 544,718

4 Claims. (Cl. 178—6)

The present invention is an improved means and method for scanning moving picture film, as in television transmission, and for increasing the practical accuracy of the scanning mechanism.

Among the purposes of the invention are: to provide maximum light efficiency in the scanning operation, to provide a means of automatically framing the transmitted picture, to provide a scanning device which allows large manufacturing tolerances, and to provide a compact apparatus suitable for multiple transmission.

Other objects of the invention are the use of a comparatively small light source, the use of an inexpensive photo-sensitive device and amplifier, the obtaining of strong signal response with resulting decrease in amplifier noise level, and the possibility of using small film or obtaining the above merits to a greater degree with large film. In the case of a light supply from a concentrated filament incandescent lamp the usual condenser lenses may be eliminated.

A still further object of this invention is to allow the employment of a single light source and/or a single scanning moving member for scanning a plurality of moving films.

Another object is to allow the transmission upon two separate channels of a plurality of motion picture films which shall be scanned in synchronism with one another.

A further object is to allow the rapid change from a film which is ended to a fresh film, without stopping the line-scanning apparatus, and without loss of time or of synchronism.

A limitation common to other methods of scanning has been the low light efficiency obtained by passing a small fraction of the available light through a scanning aperture, necessitating a very powerful light source. The present invention concentrates a relatively large proportion of the available light into a single scanning spot, allowing, for example, the use of a smaller incandescent lamp for the same effective illumination.

Another limitation common to other methods of scanning has been the great accuracy required in the machining of many scanning apertures or in the location of moving lenses, often requiring elaborate and expensive mechanical operations to accomplish. The present invention allows the use of a relatively small number of mirrors whose positions may be fixed by a simple milling operation.

Another limitation of other methods of scanning has been the large size of apparatus, usually involving a large moving disc. The present invention may utilize a small drum and relatively short light transmission path, thus allowing a very compact assembly.

My invention overcomes these divers limitations, as well as giving new and further advantages, by projecting from a rotating mirror drum substantially the entire light output of the luminous source in the form of a single highly concentrated spot of light which makes successive scannings of the image in one dimension, while the image is in continuous motion past a fixed slit in order to afford scanning in the other dimension.

As will be apparent from the drawings, I may employ only a small sized moving scanning member which has no small apertures and which gives a high optical efficiency.

Fig. 1 represents diagrammatically in part, and in perspective, the general arrangement of the optical system and part of the scanning system illustrating one form of my invention.

Fig. 2 shows, in plan, the apparatus of Fig. 1, omitting the light source and output electrical circuits but including further details of one method of drive for the film.

Fig. 3 illustrates in perspective a clutch used to start the film.

Figure 4:
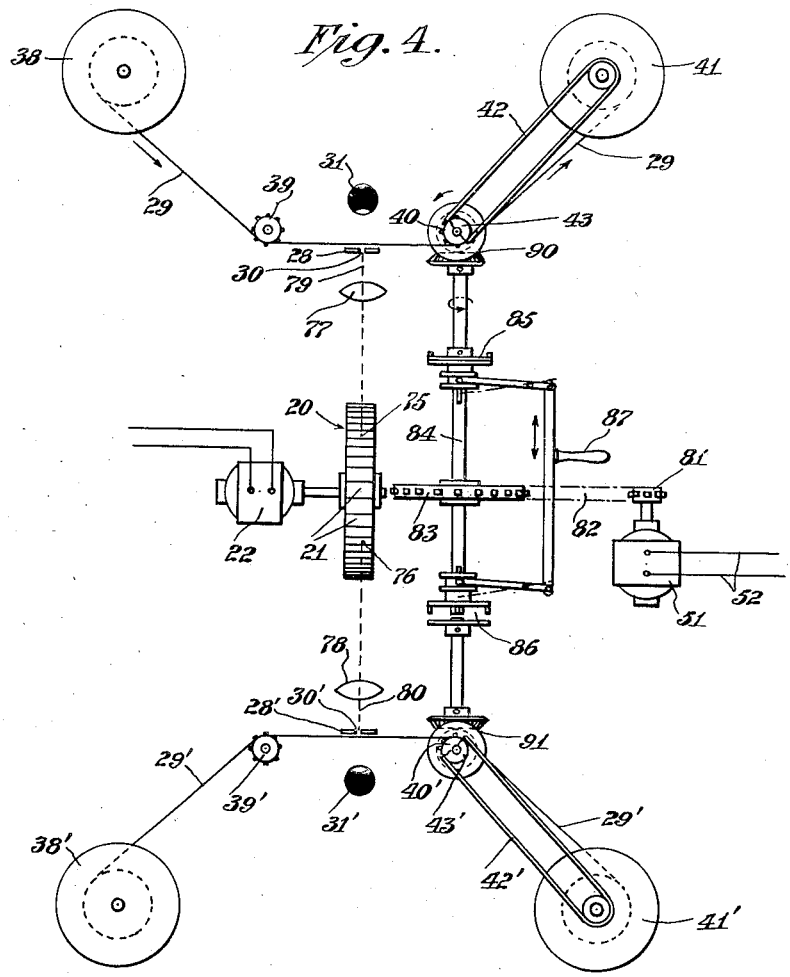
Fig. 4 shows in front elevation one way in which my invention may be adapted to scan two films simultaneously or alternately.
Figure 5:
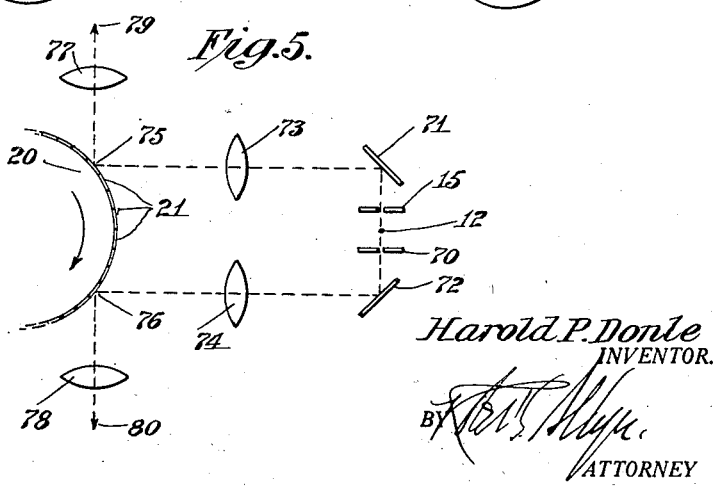

Fig. 5 diagrammatically illustrates in side elevation a portion of the optical system employed with the arrangement of Fig. 4.

Referring now especially to Fig. 1, the concave mirror 11 serves to project in one direction the image of the filament 12 which is preferably of the concentrated type, enclosed in an evacuated or gas filled transparent chamber 13 of the usual type, and receiving its heating current through conductors 14 from any appropriate power source.

A screen 15 serves to confine the light passage therethrough by means of a slit 15', whose shape is preferably in accordance with the form of the filament.

The ray of light 18 emergent from this slit will tend to spread and accordingly is passed through lenses 16 and 17, which cause it to emerge as shown at 19.

Along the path of the converging light rays is situated a drum 20, bearing upon its surface a series of mirrors 21. All of these mirrors have their longitudinal axis parallel to the axis of the drum itself. The drum 20 is rotated by a suitable motive supply, such as an electric motor 22, which preferably is of some type maintaining a constant speed.

From the mirrors upon the drum the reflected beam 24 passes through an optical system indicated by lens 26. This optical system still further converges the beam and causes it to again emerge as indicated at 27. At 28 is shown a slitted screen behind which motion picture film 29 is moved at a substantially constant velocity, so as to accomplish the scanning in one direction of the images recorded thereupon.

The slit 30 in screen 28 may be of a width approximately correspondent to one dimension of an elemental scanning area, and the beam 27 is of such a character that the resultant spot of light upon the moving film will be wide enough, in the direction of the length of the slit, to correspond to the other dimension of an elemental scanning area.

The size of this spot may conveniently be controlled, as by adjusting the width of slits 15' and 30 respectively, by adjusting the focus or in any other convenient manner.

Behind the moving film is located a light sensitive cell 31, which may be of any type, preferably having maximum response for the character of light produced by lamp filament 12. The output of this cell is conveyed by conductors 32 to amplifiers 33, modulators 34 and, for radio signaling, to transmitting apparatus 35, which radiates its output from antenna-ground system 36, 37.

In the arrangement shown in Fig. 2, film 29 leaves reel 38, passes over idler 39, is impelled by sprocket wheel 40, and rewinds upon reel 41, which is driven in the usual manner by tension belt 42, from the same shaft as the sprocket wheel. Pulleys 43 upon the same shaft as the sprocket and 44 upon the reel 41 cooperate with this belt to cause the film to rewind upon reel 41.

Referring now in addition to Fig. 3, the details of a film drive may clearly be seen. Two shafts 45 and 46 are situated end to end. Driver shaft 46 carries upon it, firmly fastened so as to rotate therewith, clutch member 47 which is in the form of a disc provided with a plurality of holes or depressions upon its periphery, as indicated at 48. Shaft 46 also carries fixed upon it the large gear member 49 which engages with small gear member 50. This last member is upon the shaft of driving motor 51, which is preferably of a constant speed type, rotating in synchronous relationship with motor 22, and receiving its energy through conductors 52. Both motors may conveniently be supplied with energy from a common supply line indicated at 53, to facilitate the maintenance of synchronism.

Shaft 45 carries at one end the film sprocket 40 and tension belt pulley 43. Along its length slides driven clutch member 54, provided with projections 55, which correspond in position with depressions 48 in the driver disc. Member 54 is held upon shaft 45 by means of key 56, which secures it thereto with respect to its rotational motion. Disc 54 may be moved longitudinally by any convenient means such as fork 54' and will engage with driver disc 47 only when projections 55 are opposite depressions 48, thus assuring that the clutch shall act only at certain angular relationships of the two members thereof.

The positions at which the clutch may engage are chosen to correspond with the positions of complete views upon the film. When using standard film with four pairs of sprocket holes per view, and using eight-toothed driving sprockets, the clutch may engage at two positions per revolution of the sprockets. The sprockets are marked so that the film may always be adjusted with a given picture-position with respect to the engaging angle of the clutch.

In the operation of this device, the light is projected from the source and limited in one direction by the slit 15' in the first screen and then is caused to describe a scanning movement by the mirrors 21 upon the drum 20. These mirrors may be concaved, for purposes of increasing the light concentration, if so desired. The motion of these mirrors causes the light beams to progressively and periodically scan the film in one dimension through the slitted screen 28. The film motion secures the scanning in the other dimension. In order that the speeds of scanning in the two dimensions shall be coordinated, it is desirable that the two driving sources be synchronized, as by a common electrical drive, or by a common mechanical interconnection, or that a single driving source be employed.

The light source may be focused upon drum 20 and refocused upon screen 28 or may be brought to a focus directly upon the screen as shown by making mirrors 21 large enough to care for the beam not yet brought to a small spot.

The speed of the film is such as to provide the desired number of frames per second, and the speed of motor 22 is such that the product of motor revolutions per second times the number of mirrors on drum 20 is equal to the product of the number of frames per second times the number of lines per frame. The distance between drum 20 and shield 28 should be great enough to maintain the light path at practically constant length throughout its useful angular rotation.

The special clutch ensures among other advantages that a film frame will enter the scanning field only when the scanning of a line is just beginning, and also that at all receivers which are operating from, or maintained in synchrony by a power source in synchrony with that which drives the shaft carrying the clutch, the received image will be maintained in frame upon stopping and restarting the film during transmission. This reduces the number of adjustments needed at a receiver during a varied programme, and prevents the annoying appearance of an image out of frame.

Co-pending application Ser. #457,217 of John V. L. Hogan discloses certain details of the mechanisms above described, including the motion of the film past a fixed scanning slit, and the clutch device for securing synchronous starting of the film, with relation to the scanning device. Other details disclosed in this same application may readily be combined with the present invention. This includes the operation of sound pick-up devices of various types in synchrony with the visual pick-up, and methods of securing the synchronous starting thereof.

Co-pending application Ser. #455,677 of John V. L. Hogan discloses certain means of moving picture and sound control which may also readily be adapted for use in connection with the present invention.

Co-pending applications Ser. #465,126 and Ser. #457,217, both of John V. L. Hogan, disclose methods of synchronizing scanning at a television transmitter and receiver which are easily combined with this present invention, as they depend upon the relation of the length, position, and character of the portions of the shield 28, lying at the extremities of the slit 30 therein.

By making the width of slits 30 and 15' of suitable ratio to each other, the principle of high detail scanning set forth in my co-pending application Ser. #433,670 may also be combined with this invention.

Due to the dimensions and arrangement of parts in my invention the optical errors are slight, and such errors are usually so small as to require no correction.

One possible source of such error is the fact that the point where the light is reflected from the mirror drum is describing a complicated path during the operation of the apparatus. This arises from the facet like effect of the mirror surfaces. Another error may be caused by the fact that the distance of such reflection point from the film is not constant.

One method of compensation for some of these errors which may be used is disclosed in my co-pending application Ser. #474,088. This consists of the employment of cylindrical lenses instead of, or in addition to the spherical lenses shown. The two-dimensional non-linearity of the path of the light spot on the film is not sufficient to produce evident distortion when the distance from drum to film is substantial but in any event may be corrected by passing the film between curved guides at the scanning point, so that all parts of the scanned line remain in the same focus.

One form of my invention which is shown in Figs. 4 and 5 illustrates how a single light source and scanning drum may be made to operate upon a plurality of moving films. 12 represents the single light source which in this case has the light issuing in two opposite directions, through screens 15 and 70, upon 45° mirrors 71 and 72, which may be either plane or concave in type. These mirrors reflect the light through optical systems 73 and 74 upon two spots 75 and 76 located on the periphery of the mirror drum 20. The beams are reflected in opposite directions through optical systems 77 and 78 and emerge as indicated at 79 and 80, the upper beam to pass through the scanning slit, moving film, and strike upon the photo-electric cell depicted in the upper portion of the figure. These parts are similar to those shown in Fig. 2, and bear identical reference numerals.

The portions of this device below the middle of the figure are duplicates of those above, are similarly numbered, and function in the same manner. The single motor 51 drives the film through sprocket 81, chain 82, sprocket 83, shaft 84, and clutches 85 and 86, which may conveniently be controlled in an alternate fashion for shifting purposes by a common control lever as shown at 87, or any well known mechanical device may be used to shift the phase on one side so that the control lever will cause simultaneous engagement of both clutches for simultaneous transmission purposes. The parts of shaft 84 beyond the clutches drive film sprockets 40 and 40', as well as the take-up belts through bevel gear systems 90 and 91.

Many variations of details of my invention are possible without departure from the spirit thereof. For example, it is possible to mount the entire apparatus or any portion of the same in other planes than those shown, that is, parts are susceptible to either horizontal or vertical mounting. Optical devices such as mirrors, lenses, prisms, or the like can be employed at various points thereof to alter the path of the light rays as desired.

Manifestly any suitable system of transmission may be employed in place of the radio transmitter shown, which is merely illustrative of one method.

My invention can also be employed for purposes of reception by utilizing either a variable light source, or a light valve between the light source and the film upon which the received image is to be recorded.

Wherever I have shown the employment of any optical system it is to be understood that any other equivalent optical system can be substituted therefor. For example, single lenses may be employed where compound are shown, and vice versa. The mirrors upon the rotating drum may either be separate structures, detachable therefrom, or may be an integral portion of its surface. In order to avoid the well known effects of double reflection, it is possible to make these mirrors of a single surface type, using highly reflective materials, such as silver, chromium, Monel metal, or the like. These metals may merely be plated upon the surfaces of the drum and suitably polished rather than mechanically attached thereto.

The limiting slit which is next to the light source can be adjusted so that the image projected shall be either that of the filament alone or that of the illuminated slit, and the image of either may be focused directly upon the film to be scanned without pre-focusing it in the vicinity of the mirror drum. This latter adjustment has the advantages of further shortening the light path and simplifying the lens system, but requires that the mirrors be large enough to reflect a beam of light having larger cross section.

With the multiple transmitter above described it is possible to transmit simultaneously images recorded by a plurality of cameras and cause the reproduction upon adjacent or overlapping screens, so that a landscape or sport field may be depicted in greater extent, if so desired, or so that stereoscopic transmission may be utilized.

The photo-electric cell should be so placed back of the film that the light beam striking thereupon will, in the extent of its scanning play, not pass beyond the sensitive elements of the cell.

If necessary, a lens may be used to converge the light passing through the film so that it will be confined within the limits of the photo-electric cell.

If image record other than of the transparent type such as motion picture film is employed, a photo-electric cell actuated by reflected light may be employed.

Other changes and variations of this invention will be apparent to those skilled in the art, and may be made without departing from the scope of this invention as defined in the following claims.

I claim:

1. Multiple scanning apparatus including a single light source, optical means for producing two concentrated substantially parallel beams from said source, a single rotating mirror drum reflecting said parallel beams in two opposite directions, a scanning slit in the path of each reflected beam, motion picture films in motion in the path of each beam and light sensitive cells in the path of each of the beams traversing said films, said mirror drum scanning both films in one direction, and said slits and relative motion of the films, scanning both films in the other direction.

2. A scanner operating simultaneously upon a plurality of motion picture films, including a fixed screening member having a scanning slit adjacent to each film, means for moving each film past said slit so as to scan in one direction, a single mirror drum reflecting a spot of light upon each of said slits, means for rotating said drum so as to scan in the other direction, a plurality of optical means directing light beams upon said drum, said drum being rotated in synchronous relationship with the motion of all said films, so that the plural scannings resulting are in frame with one another, and means for furnishing light to said optical means.

3. A motion picture scanner comprising a single light source, two mirrors each receiving light from said source and reflecting it in a beam substantially parallel to the beam reflected by the other, optical refractive means in the path of each reflected beam, a single mirror drum receiving light from both said refractive means, means for rotating said drum so as to scan in one dimension and so as to reflect the respective light beams impinging thereupon in different directions, a screening member provided with a slit in the path of each beam reflected from said drum, motion picture film behind each slit, means for moving said film so as to scan in the other dimension, and a photoelectric cell behind each film.

4. Multiple film scanning apparatus including a plurality of light beams, a single mirror drum receiving all of said beams and reflecting them in discrete directions, means for rotating said drum so as to scan in one direction, a screen having a slit in the path of each reflected beam, transparent image bearing film behind each slit, means for moving said films in a substantially uniform manner so as to scan in the other direction, and clutch means selectively controlling the operation of said film moving means, said clutch means including members engaging solely at positions predetermined in relation to the images on said films, so that the scanning process can be selectively transferred from one film to another while maintaining substantially identical framing relationships between the respective images on said films.

HAROLD P. DONLE